United States Patent
Lyon et al.

(10) Patent No.: US 7,991,515 B2
(45) Date of Patent: Aug. 2, 2011

(54) COMPUTER COOLING SYSTEM WITH PREFERENTIAL COOLING DEVICE SELECTION

(75) Inventors: Geoff Sean Lyon, Calgary (CA); Michael James Holden, Calgary (CA)

(73) Assignee: Coolit Systems Inc., Calgary (CA)

( * ) Notice: Subject to any disclaimer, the term of this patent is extended or adjusted under 35 U.S.C. 154(b) by 499 days.

(21) Appl. No.: 11/969,766

(22) Filed: Jan. 4, 2008

(65) Prior Publication Data
US 2008/0186670 A1    Aug. 7, 2008

(30) Foreign Application Priority Data
Jan. 15, 2007    (CA) ..................................... 2573941

(51) Int. Cl.
*G05D 23/00* (2006.01)
(52) U.S. Cl. ........................ 700/300; 713/340
(58) Field of Classification Search .................. 700/299, 700/300; 713/300, 340
See application file for complete search history.

(56) References Cited

U.S. PATENT DOCUMENTS

| | | | |
|---|---|---|---|
| 3,277,346 A | 10/1966 | McAdam et al. |
| 3,481,393 A | 12/1969 | Chu |
| 3,524,497 A | 8/1970 | Chu et al. |
| 4,037,270 A | 7/1977 | Ahmann et al. |
| 4,093,971 A | 6/1978 | Chu et al. |
| 4,161,213 A | 7/1979 | Heide et al. |
| 4,204,246 A | 5/1980 | Arii et al. |
| 4,253,515 A | 3/1981 | Swiatosz |
| 4,500,487 A | 2/1985 | Christie et al. |
| 4,512,161 A | 4/1985 | Logan et al. |
| 4,639,829 A | 1/1987 | Ostergren et al. |
| 4,651,781 A | 3/1987 | Kandelman |
| 4,705,102 A | 11/1987 | Kanda et al. |
| 4,712,158 A | 12/1987 | Kikuchi et al. |
| 4,729,424 A | 3/1988 | Mizuno et al. |
| 4,791,983 A | 12/1988 | Nicol et al. |
| 4,823,844 A | 4/1989 | Bartholomew |
| 5,020,586 A | 6/1991 | Mansingh |
| 5,028,988 A | 7/1991 | Porter et al. |
| 5,040,381 A | 8/1991 | Hazen |
| 5,072,787 A | 12/1991 | Nakamichi et al. |
| 5,123,478 A | 6/1992 | Hosaka |
| 5,126,919 A | 6/1992 | Yamamoto et al. |
| 5,144,531 A | 9/1992 | Go et al. |

(Continued)

FOREIGN PATENT DOCUMENTS
DE    19841583    3/2000
(Continued)

OTHER PUBLICATIONS

Cool 'n' Quiet Technology Installation Guide for AMD Athlon 64 Processor Based Systems, Revision 0.04, Advanced Micro Devices, Inc., Jun. 2004.

(Continued)

*Primary Examiner* — Ryan A Jarrett
(74) *Attorney, Agent, or Firm* — Bennett Jones LLP (57) ABSTRACT

A method for cooling an electronic component includes: providing an electronic component and a cooling device to cool the electronic component; determining the heat generating ability of the electronic component; and driving operation of the cooling device to cool the electronic component based on the heat generating ability of the electronic component. An apparatus and/or an electronics cooling device are provided based on the method.

37 Claims, 3 Drawing Sheets

U.S. PATENT DOCUMENTS

| | | |
|---|---|---|
| 5,181,560 A | 1/1993 | Burn |
| 5,213,153 A | 5/1993 | Itoh |
| 5,216,580 A | 6/1993 | Davidson et al. |
| 5,251,095 A | 10/1993 | Miller et al. |
| 5,253,702 A | 10/1993 | Davidson et al. |
| 5,263,251 A | 11/1993 | Matthews |
| 5,285,347 A | 2/1994 | Fox et al. |
| 5,323,847 A | 6/1994 | Koizumi et al. |
| 5,365,749 A | 11/1994 | Porter |
| 5,381,859 A | 1/1995 | Minakami et al. |
| 5,394,936 A | 3/1995 | Budelman |
| 5,419,780 A | 5/1995 | Suski |
| 5,457,342 A | 10/1995 | Herbst, II |
| 5,482,113 A | 1/1996 | Agonafer et al. |
| 5,509,465 A | 4/1996 | Lai |
| 5,583,746 A | 12/1996 | Wang |
| 5,587,880 A | 12/1996 | Phillips et al. |
| 5,596,228 A | 1/1997 | Anderton et al. |
| 5,606,341 A | 2/1997 | Aguilera |
| 5,640,305 A | 6/1997 | Smithers |
| 5,646,824 A | 7/1997 | Ohashi et al. |
| 5,699,227 A | 12/1997 | Kokman et al. |
| 5,704,212 A | 1/1998 | Erler et al. |
| 5,709,248 A | 1/1998 | Goloff |
| 5,727,618 A | 3/1998 | Mundinger et al. |
| 5,729,995 A | 3/1998 | Tajima |
| 5,731,954 A | 3/1998 | Cheon |
| 5,757,615 A | 5/1998 | Donahoe et al. |
| 5,823,005 A | 10/1998 | Alexander et al. |
| 5,829,516 A | 11/1998 | Lavochkin |
| 5,859,763 A | 1/1999 | Nam et al. |
| 5,909,056 A | 6/1999 | Mertol |
| 5,918,469 A | 7/1999 | Cardella |
| 5,947,192 A | 9/1999 | Kuo |
| 5,959,837 A | 9/1999 | Yu |
| 5,964,285 A | 10/1999 | Huang |
| 5,967,623 A | 10/1999 | Agnew |
| 5,988,266 A | 11/1999 | Smith et al. |
| 6,029,742 A | 2/2000 | Burward-Hoy |
| 6,062,301 A | 5/2000 | Lu |
| D426,196 S | 6/2000 | Lee |
| D426,814 S | 6/2000 | Lee |
| 6,076,557 A | 6/2000 | Carney |
| 6,125,036 A | 9/2000 | Kang et al. |
| 6,125,920 A | 10/2000 | Herbert |
| 6,138,352 A | 10/2000 | Smith et al. |
| 6,154,363 A | 11/2000 | Chang |
| 6,161,612 A | 12/2000 | Stahl et al. |
| 6,166,907 A | 12/2000 | Chien |
| 6,182,742 B1 | 2/2001 | Takahashi et al. |
| 6,184,580 B1 | 2/2001 | Lin |
| 6,196,003 B1 | 3/2001 | Macias et al. |
| 6,198,245 B1 | 3/2001 | Du et al. |
| 6,199,627 B1 | 3/2001 | Wang |
| 6,202,738 B1 | 3/2001 | Tanaka et al. |
| 6,213,194 B1 | 4/2001 | Chrysler et al. |
| 6,223,815 B1 | 5/2001 | Shibasaki |
| 6,226,178 B1 | 5/2001 | Broder et al. |
| 6,253,835 B1 | 7/2001 | Chu et al. |
| 6,257,320 B1 | 7/2001 | Wargo |
| 6,310,771 B1 | 10/2001 | Chien |
| 6,330,906 B1 | 12/2001 | Wang |
| 6,340,056 B1 | 1/2002 | Huang et al. |
| 6,341,490 B1 | 1/2002 | Jones |
| 6,343,010 B1 | 1/2002 | Tanaka |
| 6,367,542 B1 | 4/2002 | Chen |
| 6,381,844 B1 | 5/2002 | Bollesen |
| D458,232 S | 6/2002 | Lee |
| 6,404,632 B1 | 6/2002 | Forkas |
| 6,407,916 B1 | 6/2002 | Konstad |
| 6,424,533 B1 | 7/2002 | Chu et al. |
| 6,446,442 B1 | 9/2002 | Batchelor et al. |
| 6,466,438 B1 | 10/2002 | Lim |
| 6,496,371 B2 | 12/2002 | Winkel et al. |
| 6,538,891 B1 | 3/2003 | He et al. |
| 6,543,485 B2 | 4/2003 | Henry et al. |
| 6,580,608 B1 | 6/2003 | Searls et al. |
| 6,604,575 B1 | 8/2003 | Degtiarenko |
| 6,619,044 B2 | 9/2003 | Batchelor et al. |
| 6,646,874 B2 | 11/2003 | Pokharna et al. |
| 6,686,532 B1 | 2/2004 | Macris |
| 6,717,814 B2 | 4/2004 | Li |
| 6,723,917 B1 | 4/2004 | Wang |
| 6,725,682 B2 | 4/2004 | Scott |
| 6,808,013 B2 | 10/2004 | Lai et al. |
| 6,820,685 B1 | 11/2004 | Carter et al. |
| 6,822,861 B2 | 11/2004 | Meir |
| 6,830,098 B1 | 12/2004 | Todd et al. |
| 6,837,057 B2 | 1/2005 | Pokharna et al. |
| 6,935,409 B1 | 8/2005 | Parish, IV et al. |
| 6,937,472 B2 | 8/2005 | Pokhama |
| 6,947,283 B2 | 9/2005 | Hsieh et al. |
| 6,971,243 B2 | 12/2005 | Scott |
| 6,986,382 B2 | 1/2006 | Upadhya et al. |
| 6,988,534 B2 | 1/2006 | Kenny et al. |
| 6,996,441 B1 * | 2/2006 | Tobias .......................... 700/44 |
| 7,000,684 B2 | 2/2006 | Kenny et al. |
| 7,038,909 B1 | 5/2006 | Chen |
| 7,104,312 B2 | 9/2006 | Goodson et al. |
| 7,108,016 B2 | 9/2006 | Moskalik et al. |
| 7,113,399 B2 | 9/2006 | Hisano et al. |
| 7,121,304 B2 | 10/2006 | Gray, Jr. |
| 7,126,826 B1 | 10/2006 | Sorensen et al. |
| 7,148,589 B2 | 12/2006 | Nishigaki et al. |
| 7,156,159 B2 | 1/2007 | Lovette et al. |
| 7,167,369 B1 | 1/2007 | Huynh et al. |
| 7,174,738 B2 | 2/2007 | Scott |
| 7,269,014 B1 | 9/2007 | Zhao et al. |
| 7,272,006 B2 | 9/2007 | Mongia et al. |
| 7,310,226 B2 | 12/2007 | Chen et al. |
| 7,508,671 B2 * | 3/2009 | Sauciuc et al. ................ 361/700 |
| 7,515,996 B2 * | 4/2009 | Wald ............................ 700/300 |
| 2001/0023756 A1 | 9/2001 | Tanaka et al. |
| 2002/0023737 A1 | 2/2002 | Hao |
| 2002/0043360 A1 | 4/2002 | Lee |
| 2002/0091468 A1 * | 7/2002 | Nagashima et al. .......... 700/300 |
| 2002/0118512 A1 | 8/2002 | Lee et al. |
| 2002/0121358 A1 | 9/2002 | Lee |
| 2002/0180034 A1 | 12/2002 | Winkel et al. |
| 2003/0103332 A1 | 6/2003 | Sopko et al. |
| 2003/0131972 A1 | 7/2003 | Cosley et al. |
| 2004/0104010 A1 | 6/2004 | Kenny et al. |
| 2004/0104012 A1 | 6/2004 | Zhou et al. |
| 2004/0104022 A1 | 6/2004 | Kenny et al. |
| 2004/0112585 A1 | 6/2004 | Goodson et al. |
| 2004/0150952 A1 | 8/2004 | Yu et al. |
| 2004/0163796 A1 | 8/2004 | Wu et al. |
| 2004/0182548 A1 | 9/2004 | Lovette et al. |
| 2004/0188077 A1 | 9/2004 | Holl |
| 2004/0206477 A1 | 10/2004 | Kenny et al. |
| 2005/0013120 A1 | 1/2005 | Liu |
| 2005/0082034 A1 | 4/2005 | Hwang et al. |
| 2005/0092463 A1 | 5/2005 | Lopatinsky |
| 2005/0161198 A1 | 7/2005 | Makino et al. |
| 2005/0161199 A1 | 7/2005 | Ma et al. |
| 2005/0269061 A1 | 12/2005 | Brewer et al. |
| 2007/0070603 A1 | 3/2007 | Park et al. |
| 2007/0094527 A1 * | 4/2007 | Frietsch et al. ............... 713/340 |
| 2007/0121300 A1 | 5/2007 | Xia et al. |
| 2007/0223197 A1 | 9/2007 | Xia et al. |
| 2008/0035311 A1 | 2/2008 | Hsu |

FOREIGN PATENT DOCUMENTS

| | | |
|---|---|---|
| DE | 20 2005 017349 U1 | 1/2006 |
| EP | 1507290 | 2/2005 |
| GB | 2059569 | 4/1981 |
| GB | 2349985 | 11/2000 |
| JP | 57188855 | 2/1983 |
| WO | WO 00/75763 | 12/2000 |
| WO | WO 03/007372 | 1/2003 |
| WO | WO 03/060676 | 7/2003 |
| WO | WO 2004/088492 | 10/2004 |

OTHER PUBLICATIONS

Josh Norem, Tuniq Tower 120 CPU Cooler, Maximum PC, Dec. 2005.

Tuniq "Performance—Tower 120 Performance Test Results" located on the internet, Dec. 12, 2005, www.tuniq.com.tw.

* cited by examiner

COMPUTER COOLING SYSTEM WITH PREFERENTIAL COOLING DEVICE SELECTION

FIELD

The present invention relates to a system for controlling an electronics cooling device.

BACKGROUND

Electronics including computers, drivers, and data storage devices may require cooling to permit proper operation. Cooling can be effected by cooling devices such as fans or liquid cooled systems.

Generally, cooling devices are controlled by sensing temperatures within the system. For example, a thermistor, a thermocouple or other heat sensor or switch is used to sense the temperature of a portion of the electronics, of air passing a portion of the cooling device, of air within the housing of the electronics, of the coolant in a liquid cooled system, etc. However, by measuring the temperature of a component or air and driving the cooling device based thereon, the cooling device is often driven to effect cooling after the electronics has already reached a high temperature. This may cause an unstable feedback loop to be established where the cooling device may continually have to chase the cooling requirements of the electronics and, as such, the electronics may cycle through overheated and overcooled conditions.

SUMMARY

In accordance with one broad aspect of the present invention, there is provided a method for cooling an electronic device, the method comprising: providing an electronic device and a cooling device to cool the electronic device; determining the heat generating ability of the electronic device; and driving operation of the cooling device to cool the electronic device based on the heat generating ability of the electronic device.

In accordance with another broad aspect of the present invention, there is provided an apparatus comprising: an electronic device; a cooling device to cool the electronic device; and a control system communicating with the electronic device and communicating with the cooling device, the control system operable based on the heat generating ability of the electronic device to drive operation of the cooling device.

In accordance with another broad aspect of the present invention, there is provided an electronics cooling control device comprising: a first port for communication with at least one of a power usage indicator for an electronic device and a processor usage indicator for the electronic device; a second port for communication with a cooling device; a function to process usage information regarding at least one of the power usage and the processor usage of the electronic device; a function to drive the operation of the cooling device based on the usage information.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

BRIEF DESCRIPTION OF THE DRAWINGS

Referring to the drawings, several aspects of the present invention are illustrated by way of example, and not by way of limitation, in detail in the figures, wherein.

DETAILED DESCRIPTION OF VARIOUS EMBODIMENTS

The description that follows, and the embodiments described therein, are provided by way of illustration of an example, or examples, of particular embodiments of the principles of various aspects of the present invention. These examples are provided for the purposes of explanation, and not of limitation, of those principles and of the invention in its various aspects. In the description, similar parts are marked throughout the specification and the drawings with the same respective reference numerals. Any drawings are not necessarily to scale and, for example, may be schematic representations or proportions may have been exaggerated in order more clearly to depict certain features.

A method for cooling an electronic component has been invented. The method includes: providing an electronic component and a cooling device to cool the electronic component; determining the heat generating ability of the electronic component; and driving operation of the cooling device to cool the electronic component based on the heat generating ability of the electronic component.

An apparatus has also been invented including: an electronic component; a cooling device to cool the electronic component; and a control system communicating with the electronic component and communicating with the cooling device, the control system operable based on the heat generating ability of the electronic component to drive operation of the cooling device.

An electronics cooling device has also been invented based on the foregoing.

The various embodiments of the invention operate on the basis of predicting the heat generating ability of an electronic device and driving a cooling system and device based on that heat generating ability. Thus, rather than waiting until a hot condition is sensed, wherein heat has already been generated and heat energy has built up to the extent that the electronics device requires cooling, the present methods and devices may be used to predict the cooling requirements and act quickly and possibly before or as the heat is generated to cool the electronics.

Electronic devices to be cooled by a method and device as described herein may include one or more of a computer, a storage rack, disc storage, a server, a server rack, a blade server, rack mounted equipment, a switch, a router, combinations thereof, etc.

In a computer, various electronic device components are of particular interest with respect to heat generation and cooling. Some of those devices include one or more of a CPU, a GPU, a chipset, RAM, a video card, a voltage regulator, hard drive, physics card, sound card, combinations thereof, etc.

These devices may be cooled by any one or more of a liquid cooling system, a fan, a heat pipe, a thermoelectric cooler (TEC), computer room air conditioning (CRAC), combinations thereof, etc. For example, a liquid cooling system with which this cooling technology works is the Boreas 12-TEC chiller, available from the assignee of this invention. While some other cooling alternatives are restricted to a single processor, the Boreas all-in-one solution can apply the present technology to chill the CPU, GPU, and chipsets in one computer which may allow for good overclocking performance. Some other cooling devices which may be used with the present technology, for example, may include a RAM fan or a PCI Cooling Booster™ (CoolIT Systems Inc., Calgary, Alberta, Canada) which provide direct air flow to cool other heat sensitive components on the motherboard like chipsets and voltage regulators.

Other electronic devices, such as server racks, etc. noted above, may also include fans, liquid cooling systems, air conditioning units, etc. to cool the components therein.

The cooling power of any cooling system may be regulated in various ways. Generally, the regulation of cooling power depends on the type and number of cooling devices available. For example, cooling power in a computer can be regulated in an air cooled system by driving the speed of a fan and/or the number of fans operating. In a liquid cooled computer system, cooling power can be regulated by control of any or a combination of pump speed and/or power to the thermoelectric coolers and/or the flow of cooling fluid (i.e. air) through the radiator.

Using a computer as an example, a computer cooling control device may provide a cooling functionality that effectively allows the device to anticipate heat production from at least one heat generating component of interest and to adjust cooling power accordingly, based on the anticipated heat production, to provide cooling stability. Such functionality is provided by placing the computer cooling control device in communication with both the computer and the computer's cooling device (i.e. a fan, a liquid cooling system etc.) and further by use of software that determines, from communication with the computer, the activity of the heat generating device of interest and thereby controls operation of the cooling device. In a computer, the heat generating capability of a heat generating device may be determined in various ways. For example, the heat generating capability of a computer component can be determined to some extent by determining the following: (i) the type of components in a computer such as, for example, the type of CPU that a computer has installed, (ii) the ability of a computer cooling device or system to handle thermal energy generated in the computer, and/or (iii) the type of application being run (i.e. surfing the internet and/or handling emails may represent lower heat generating applications than a gaming application). In addition or alternately, since power input generally indicates heat out, the heat generating capability of a computer component may be determined accurately by: (iii) determining component utilization and/or (iv) determining power consumption.

Most current computers monitor and report in actual or substantial real time, at least some of the utilizations of heat generating components. For example, most current computers monitor and report in actual or substantial real time, termed collectively "real time", at least some of the CPU, GPU and chipset utilizations, termed herein processor utilization. As will be appreciated for example, CPU usage may be visualized on a real time basis through a computer's task bar and such information can be obtained from the system control software. Thus, by communicating with the computer's system control software, including for example, the operating system or the BIOS, processor utilization can be determined in real time and used to determine the activity of various computer components, which information indicates heat generation.

Information on a computer's power consumption can also be used to anticipate heat generation. In a computer, power consumption is generally linked to processor utilization, so that an increase in the computer's power consumption can be correlated to an increase in processor activity and therefore an increase in heat generation. To determine power consumption, a meter may be used. For example, a power meter can be connected into the power supply. Alternately or in addition, intelligent power supplies are available that automatically can report power consumption. The information obtained from the power meter may be used to anticipate heat generation of the computer and the computer's main components.

Although processor utilization and power consumption can both be monitored to determine the computer's heat generating capability, one or the other of these two determinations can be used on their own, if desired.

Communication between the cooling control device and a computer may be achieved by loading software directly to the computer, by wireless communication or by physical connection, such as by USB, network cable (TCP/IP) connections or wired connections to a power meter. Communication between the one or more cooling devices of the apparatus and the cooling control device may be most readily achieved by wired connections.

If desired, the thermal condition of the computer can also be considered by the cooling control system. For example, using a temperature sensor, the temperature of a computer component or environment can be monitored and information obtained therefrom can be fed into the cooling control system to provide secondary, back-up information for the cooling control device and method. For example, a temperature sensor may be provided to detect, for example, the temperature of (i) exhaust air, (ii) air inside the computer housing, (iii) liquid coolant, (iv) a heat generating component directly, etc. Although, according to the present invention, a computer cooling control system uses a main control system based primarily on the determination and use of a heat generating capability of the computer and its components, temperature monitoring may be used as a back-up should the main control system fail. For example, if the operating system crashes or a component malfunctions, temperature monitoring may provide more sophisticated control to ensure that the computer's components are cooled to some extent. If the primary indicators of heat generating capability fail, the control device and method can continue to regulate the one or more cooling devices based on the secondary information available to it, which is based primarily on existing system temperatures.

By monitoring and assessing both the heat-generating capability indicators and the system temperatures, the cooling power can be adjusted accordingly in an attempt to maintain the heat in the system below a selected level and generally stable. As such the cooling control system can operate to control cooling system operation prior to, with or shortly after the heat is actually generated by the computer. In one embodiment, a control module may include a USB connected board that allows full software interaction to dynamically control the cooling power, including fan speeds, TEC power, etc. of nearly any chilling solution. Such control may, if desired, depend on the preferences of the end user.

Figure 1:
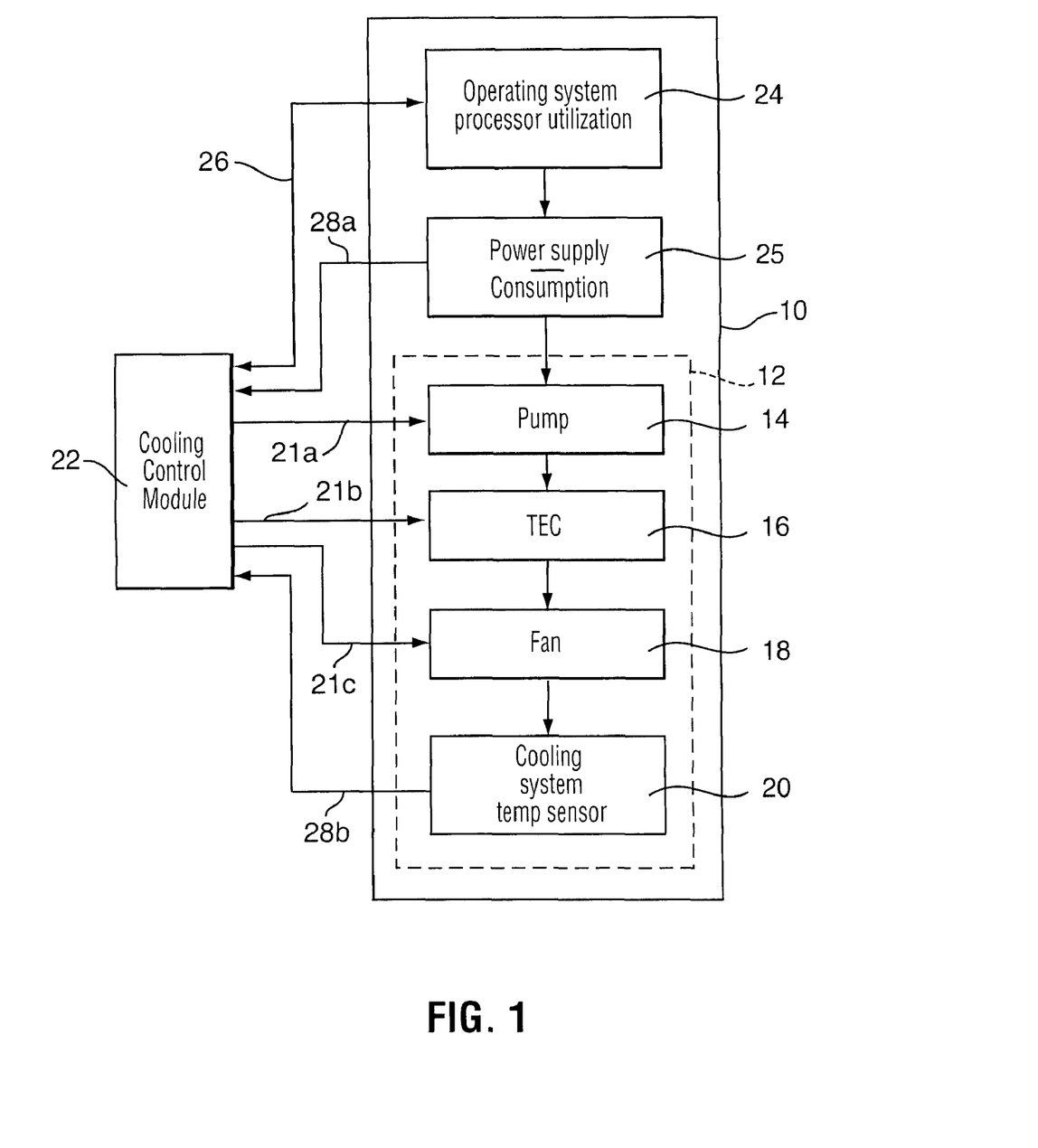
FIG. 1 is a schematic representation of one embodiment of a system according to the present invention.

With reference to FIG. 1, for example, a schematic cooling system is shown. The cooling system includes a computer 10 including a cooling system 12 for cooling one or more of the computer's components. In this embodiment, the cooling system includes a liquid cooled system including a pump 14 to drive the liquid coolant through the system and a thermoelectric cooler 16 to act as a heat pump to extract thermal energy from the coolant and a fan 18 to move air past a liquid coolant heat exchanger and generally through the computer chassis. Cooling system 12 further includes a temperature sensor 20 for reporting a temperature indicative of the computer operation. For example, temperature sensor 20 may be positioned and capable of determining the temperature of a computer component, air or liquid coolant.

A cooling control module 22 may be provided to anticipate the cooling requirements of the computer and to drive the cooling system devices 14, 16 and/or 18 accordingly to seek to maintain an optimal operating temperature for the computer. Cooling control module 22 is in controlling communication with the components of cooling device 12 by connections 21a, 21b, 21c. Cooling control module 22 can control the operation of these cooling system components 14, 16, 18, as by use of software, digital or analog means, to control their cooling power. For example, the control module can control the activity and speed of operation of fan 18 or pump 14 and/or the power driving TEC 16, for example to turn them on and off and or to drive their operation on low or high power or at some setting therebetween.

In the presently illustrated embodiment, control module 22 anticipates the cooling requirements by monitoring computer function on an on-going basis during operation of the computer. While the control module could also or alternately anticipate the cooling requirements by seeking information on static computer features, such as type of CPU and/or type of cooling system components, in the present embodiment, control module 22 is in communication with the computer's operating system 24 which reports core utilization in real time. The control module regularly, and possibly substantially continuously, obtains the reported core utilization and, since processor activity correlates to the heat generation of the computer component, control module 22 can use that information to appropriately drive the cooling power generated by the cooling devices. For example, if control module 22 determines that the computer system control software is reporting an increase in processor activity, the control module can substantially immediately drive one or more of the cooling devices 14, 16, 18 to increase the cooling power for the computer system.

In the present embodiment, control module 22 is further in communication with the computer's power supply 25 through which information on power consumption can be obtained. The information on power consumption can be obtained by a meter such as an ammeter or through the use of an intelligent power supply, which reports power usage and such information is available for communication to the control module. Since power consumption directly correlates to the heat generation of the computer components, control module 22 can use that information to appropriately drive the cooling components. For example, if control module 22 determines from communication directly or indirectly with a power meter or intelligent power supply, that the computer's power consumption is increasing, the control module can drive one or more of the cooling devices 14, 16, 18 to increase the cooling power for the computer system.

In the illustrated embodiment, control module 22 is further in communication with temperature sensor 20 of the cooling system. As such, control module 22 can obtain information on the computer and/or cooling system temperature, depending on the particular temperature sensed by the sensor. This temperature information may be useful supplemental or back-up information, to provide back-up to computer usage information or more sophisticated cooling system control.

In the illustrated embodiment, control module 22 is an external component and communication between the control module and operating system 26 in the present embodiment, is by way of a USB cable 26. Control module 22 is further connected for communication with power supply 25 and temperature sensor 20 by lines 28a, 28b. Although particular connections are shown, other communication means may be used including installing device 22 or the software of the device in the computer and wireless and network options.

Control device 22 may operate on the basis of software. In addition, to the basic operations, as described hereinabove, the software may allow more sophisticated control of cooling system 12 based on various inputs. For example, the device and method may further be used to control the power usage and acoustic properties of the computer. For example, based on anticipated heat generation, the cooling device operations can be ramped up or down or one form of cooling device can be selected over another to conserve power. Alternately, based on anticipated computer operations such as selection of an application, a more acoustically loud but less power consuming cooling option may be selected. For example, by communication with the computer's system control software, control device 22 can determine that a gaming application is being run. Since gaming applications generally are acoustically loud, it can be assumed that the operation of a fan at a high speed, which itself creates a lot of noise but has relatively low power requirements than a TEC, may have minimal interference with the user's enjoyment. In such a case, the control device, based on software control, after determining that a louder computer application is being run, can preferentially drive louder cooling devices over those requiring more power.

Alternately or in addition, control device 22 may include a reporting function to report to the computer or other means (i.e. internet, pda, etc.) operational information concerning the computer and the cooling system. For example, through the USB connection 26, control module 22 may report to the computer user on, for example: cooling system operations (i.e. fan speed, cooling system or environment temperature, etc.), computer usage information (i.e. CPU utilization, power consumption, etc.) and/or alerts (i.e. when a monitored condition is met, overheating, etc.). Such reports may be by email, SMS, pop-ups, task bar access, etc.

Control device 22 may be provided with preset functions and parameters for operation including preset limits on processor operation, cooling device operational parameters (i.e. fan speed, etc.), modes of communication and reporting. Alternately or in addition, control device 22 may allow user selection of parameters. Users, through the control device, may limit the CPU/GPU temperatures, the CPU speed, the fan speed, the preferences between fan and TEC operation and/or other parameters of interest.

A control module may include a microprocessor, memory storage, one or more pulse width modulators or other power control means to output control to the cooling devices and electrical connectors and ports for wired connection to the various components. A computer user, such as a gamer, can obtain the computer 10 and the cooling system 12 with various devices. Control module 22 can be obtained and connected to the computer components via lines 21, 26 and 28. Control module 22 may be preset to operate as is to receive input information and output cooling device control. Alternately, and more usually, control module 22 may be set up by the user, as by interface with client software to be loaded onto computer 10. Set up may include input of information relating to the type of cooling system or cooling devices, the type of processors, the type of operating system, various limits on computer and cooling device function, input of an email address for sending alerts, passwords for access, etc.

Figure 2:
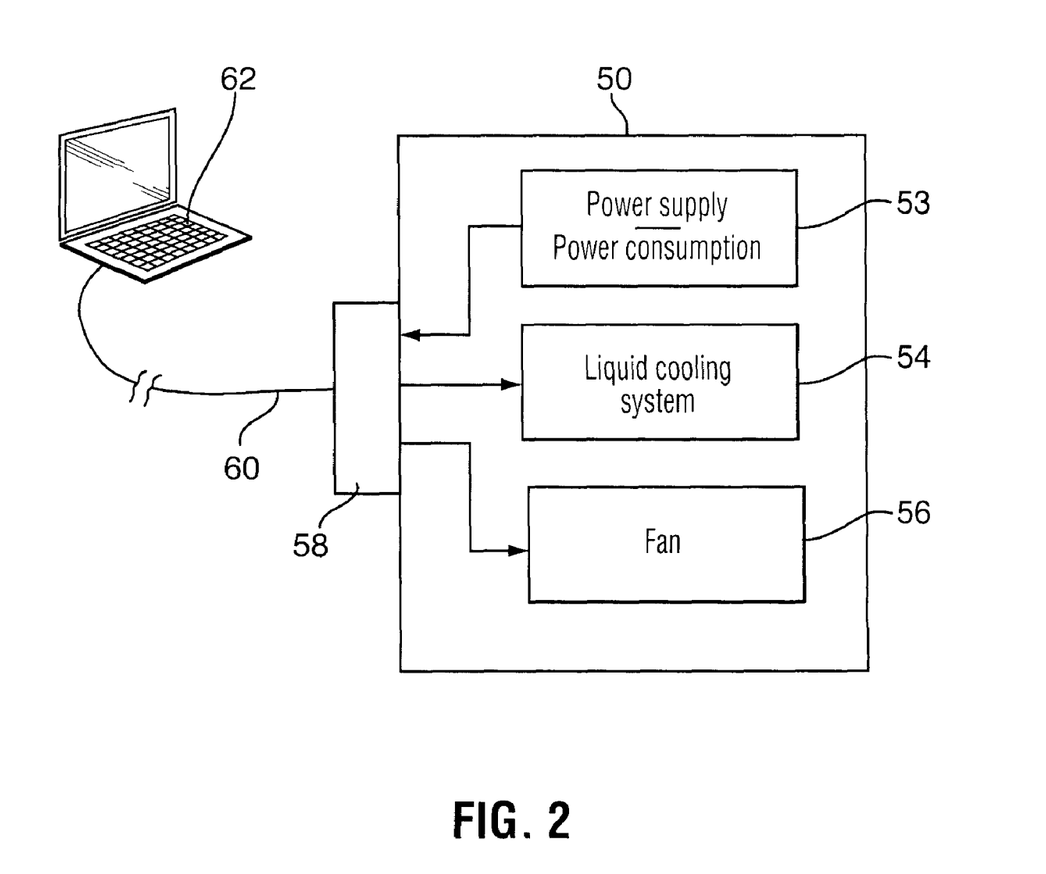
FIG. 2 is a schematic representation of another embodiment of a system according to the present invention.

In a multicore or multiprocessor system, it may be difficult to determine processor utilization. Thus, in electronic systems such as server racks, disc storage, LAN attached processors, etc., a cooling system according to the present invention may more readily anticipate heat generating capability by determining power usage. By obtaining the power usage of the electronics, such as a rack, as a whole, a cooling solution for the entire system can be determined in advance of the heat being generated or as the heat is generated. With reference to FIG. 2, for example, an embodiment offering a rack cooling solution is shown schematically. The illustrated apparatus includes a rack 50 with a plurality of heat generating components therein, a power supply 53 for at least some of the heat generating components in the rack and a cooling system including a liquid cooling system 54 including a manifold, a pump and coolant lines to the various heat generating components and a fan 56 for driving air through the rack enclosure and/or over a radiator for the liquid cooling system. The cooling system may include sensors (not shown) for temperature monitoring, if desired. The apparatus further includes a cooling control device 58 mounted on the rack to receive power usage information from power supply 53 and to direct the cooling power delivered by the liquid cooling system 54 and fan 56. While the apparatus does not include a computer, if desired, set up and/or monitoring of the cooling control device can be achieved by network land line or wireless connections. For example, in the illustrated embodiment, device 58 is connected by TCP/IP-type network cable 60 to a computing device 62 such as a computer, pda, etc. that can be located anywhere through network connections.

Device 58 can be incorporated into rack 50 during manufacture or can be installed as an additional component to an existing rack.

Figure 3:
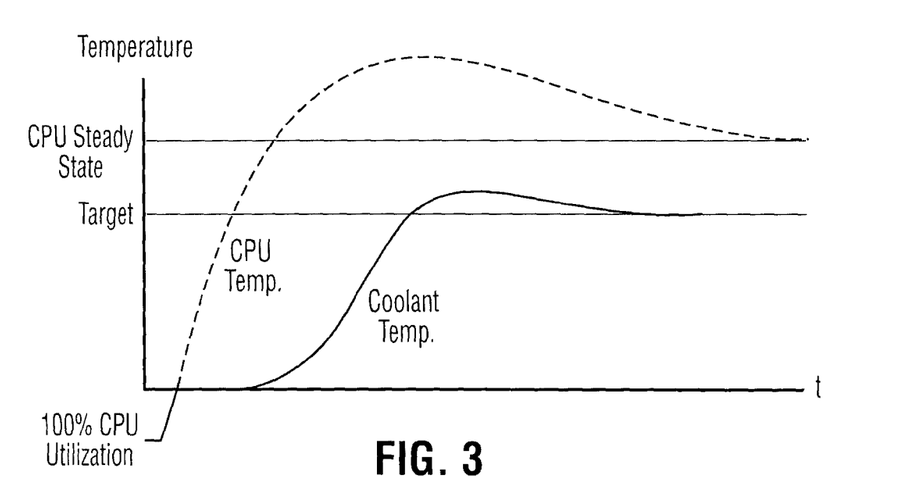
FIG. 3 is a graph showing CPU and cooling responses in a prior art system.
Figure 4:
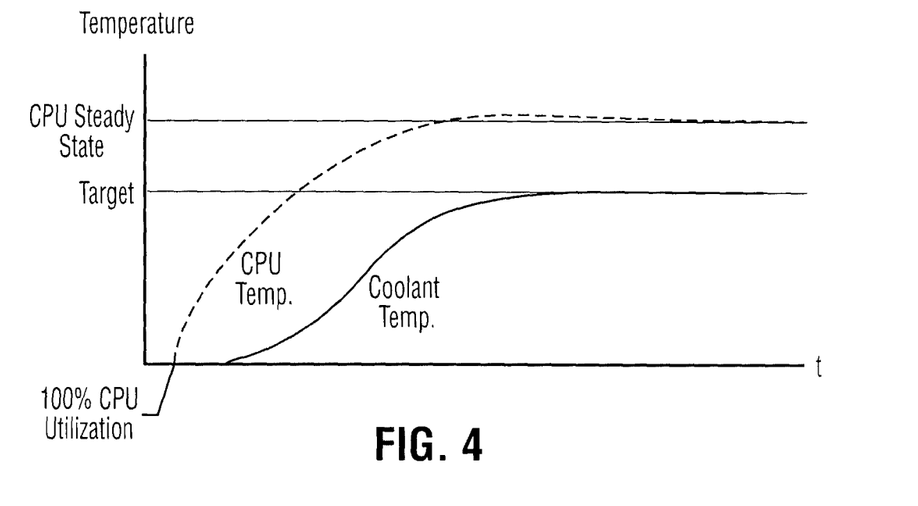
FIG. 4 is a graph showing CPU and cooling responses according to one aspect of the present invention.

FIG. 3 illustrates graphically the prior art approach to electronics and FIG. 4 illustrates graphically the current approach. The graphs presented in FIGS. 3 and 4 are prepared using identical scales so that the results can be directly compared between the graphs. The graphs show the CPU temperature and coolant temperature during operation of a computer with liquid cooling. A CPU can have a target temperature at or below which its operation is satisfactory. Generally it is acceptable to maintain the CPU at the target temperature, but it is disadvantageous to allow the CPU temperature to peak significantly beyond the target temperature. Also, it is desirable to avoid significant and repeated fluctuations, during operation, above or below the target temperature.

FIG. 3 shows the result of a prior art approach to computer cooling, which uses an algorithm termed the P.I.D. (Proportional, Integral and Derivative) algorithm based on monitoring coolant temperature. The algorithm is as follows:

$$\Delta C_{pwr}(t) = K_p(e(t) + K_i \int_0^t e(\tau) d\tau + K_d de/dt)$$

wherein e(t) is the error, or difference between a target temperature and the current coolant temperature at time t;
$K_p$, $K_i$ and $K_d$ are known constants relating the functioning and response of chiller technologies. The constants may vary depending on the type and form of the chiller, but are determinable by a skilled person;
$\int_0^t e(\tau) d\tau$ is the average error over a set time period; and
$K_d$ de/dt is the change over time of the errors.

This algorithm is used by current computer cooling controllers to drive cooling system operation. FIG. 3 shows the temperature against time cooling response achieved using this algorithm. While this tuned P.I.D. algorithm offers accurate, non-oscillating temperature control, there is a lag in the cooling response time since the equation is based on coolant temperature. The lag slows the ability of the cooling system to regulate the temperature of the CPU and, thus, the CPU temperature can overshoot the CPU target temperature.

An approach according to an aspect of the present invention adds a second term to the above PID equation to account for CPU utilization:

$$\Delta C_{pwr}(t) = K_p(e(t) + K_i \int_0^t e(\tau) d\tau + K_d de/dt) + U_p(u(t) + U_i \int_0^t u(\tau) d\tau + U_d du/dt)$$

u(t) is the error, or difference between the nominal cpu utilization and the average cpu utilization at time t;
$U_p$, $U_i$ and $U_d$ are constants representing the responsiveness and operational characteristics of specific chiller technology. These constants are chiller specific and determinable by a skilled person;
$\int_0^t u(\tau) d\tau$ is the average cpu utilization over a set time period; and
$K_d$ du/dt is the change over time of the cpu utilization.

Using this algorithm, the cooling system control can anticipate cooling requirements based on CPU utilization and drive the cooling devices based on the CPU utilization. FIG. 4 shows the temperature against time cooling response achieved using this algorithm. As shown, the cooling system can begin earlier to increase the rate of thermal energy unloaded from the coolant. Thus, as CPU utilization increases, even before substantial thermal energy is generated, the cooling system can respond by increasing the ability of the cooling devices to thermally unload the system. As such, any temperature increase of the CPU is controlled, and thereby more efficient, and substantially avoids the CPU from overshooting its target temperature. While CPU utilization information alone can be used to control the cooling device operations, in this embodiment, temperature monitoring of the coolant is also used as a secondary input to supplement cooling control. When compared to a cooling solution that does not act on the CPU utilization, the current solution offers lower CPU peak temperatures and lower cooling power. In particular, the current system is more power efficient since power is saved when the CPU temperature substantially does not overshoot steady state.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

We claim:

1. A method for cooling a computer, the method comprising:
   providing a computer and a cooling system to cool the computer, the cooling system including a louder cooling device and a higher power consuming cooling device;
   determining the heat generating ability of the computer by determining a power consumption for the computer and determining that an application is being run by the computer; and
   driving operation of the cooling system to cool the computer based on the heat generating ability of the computer and based on the application being run by the computer, wherein after it is determined that an acoustically loud application is being run by the computer, preferentially driving operation of a louder cooling device over a higher power consuming cooling device.

2. The method of claim 1 wherein determining the heat generating ability of the computer further comprises determining a heat generating component utilization in the computer.

3. The method of claim 2 further comprising sensing a temperature indicative of a thermal condition of the computer and driving operation of the cooling system based on the temperature sensed.

4. The method of claim 1 further comprising sensing a temperature indicative of a thermal condition of the computer and driving operation of the cooling system based on the temperature sensed.

5. The method of claim 4 wherein the cooling system includes a liquid coolant and wherein sensing a temperature includes sensing a temperature of the coolant.

6. The method of claim 1 wherein determining the heat generating ability and driving operation of the cooling system are repeated throughout an operational period of the computer to provide substantially continuous cooling system control during the period.

7. The method of claim 1 wherein determining the heat generating ability is conducted on an on-going basis during operation of the computer.

8. The method of claim 1 wherein providing the computer includes providing a multicore or multiprocessor device.

9. The method of claim 8 wherein the multicore or multiprocessor device includes at least one of a storage rack, disc storage, a server, a server rack, a blade server, rack mounted IT equipment, a switch or a router.

10. The method of claim 1 wherein providing the computer includes providing one or more of a CPU, a GPU, a chipset, RAM, a video card, a voltage regulator, a hard drive, a physics card, or a sound card.

11. The method of claim 1 wherein providing the cooling system includes providing any one or more of a liquid cooling system, a fan, a heat pipe, a thermoelectric cooler (TEC) or computer room air conditioning unit.

12. The method of claim 1 wherein driving operation of the cooling system includes selecting a speed at which a cooling fan operates.

13. The method of claim 1 wherein driving operation of the cooling system includes selecting a degree to which thermoelectric coolers are powered in a liquid cooled system.

14. An apparatus comprising:
   a computer;
   a cooling system to cool the computer; and
   a cooling control system communicating with the computer and communicating with the cooling system, the cooling control system operable to drive operation of the cooling system based on the heat generating ability of the computer determined based on a power consumption value for the computer and operable, based on software control, to determine that an application is being run by the computer and after determining that a louder computer application is being run, preferentially driving a louder cooling device over a second cooling device with a higher power consumption.

15. The apparatus of claim 14 wherein the cooling control system determines a heat generating component utilization in the computer.

16. The apparatus of claim 15 wherein the heat generating component includes a CPU.

17. The apparatus of claim 15 wherein the cooling control system further is operable to obtain a temperature indicative of a thermal condition of the computer and to drive operation of the cooling system based on the temperature sensed.

18. The apparatus of claim 14 wherein the power consumption value for the computer is determined by a power meter or an intelligent power supply in communication with the power supply for the computer.

19. The apparatus of claim 18 wherein the cooling control system further is operable to obtain a temperature indicative of a thermal condition of the computer and to drive operation of the cooling system based on the temperature sensed.

20. The apparatus of claim 19 wherein the cooling system includes a liquid coolant and wherein a temperature indicative of a thermal condition of the computer is a temperature of the coolant.

21. The apparatus of claim 14 wherein the cooling control system further is operable to obtain a temperature indicative of a thermal condition of the computer and to drive operation of the cooling system based on the temperature sensed.

22. The apparatus of claim 14 wherein the cooling control system provides substantially continuous cooling system control during operation of the computer.

23. The apparatus of claim 14 wherein the computer includes a multicore or multiprocessor device.

24. The apparatus of claim 23 wherein the multicore or multiprocessor device includes at least one of a storage rack, disc storage, a server, a server rack, a blade server, rack mounted IT equipment, a switch or a router.

25. The apparatus of claim 14 wherein the computer includes one or more of a CPU, a GPU, a chipset, RAM, a video card, a voltage regulator, a hard drive, a physics card, or a sound card.

26. The apparatus of claim 14 wherein the cooling system includes any one or more of a liquid cooling system, a fan, a heat pipe, a thermoelectric cooler (TEC) or computer room air conditioning unit.

27. The apparatus of claim 14 wherein the cooling control system drives operation of the cooling system by selecting a speed at which a cooling fan operates.

28. The apparatus of claim 14 wherein the cooling control system drives operation of the cooling system by selecting a degree to which thermoelectric coolers are powered in a liquid cooled system.

29. An electronics cooling control device comprising:
   a first port for communication with a power usage indicator for a computer;
   a second port for communication with a cooling system;
   a function to process usage information regarding the power usage of the computer and to determine that an application is being run by the computer; and
   a function to drive the operation of the cooling system based on the usage information and based on the application being run, wherein after determining that a louder computer application is being run, preferentially driving a louder cooling device over a second cooling device requiring more power.

30. The electronics cooling control device of claim 29 wherein the first port is a port for USB connection to a computer.

31. The electronics cooling control device of claim 29 wherein the first port is a port for connection to a power meter.

32. The electronics cooling control device of claim 29 further comprising a connection for communication with a processor usage indicator and a function to process usage information regarding the processor usage of the computer and wherein the processor usage information is with respect to a CPU.

33. The electronics cooling control device of claim 29 wherein the cooling control device further includes a function to process a temperature indicative of a thermal condition of the computer and to drive operation of the cooling system based on the temperature sensed.

34. The electronics cooling control device of claim 33 wherein the cooling system includes a liquid coolant and wherein a temperature indicative of a thermal condition of the computer is a temperature of the coolant.

35. The electronics cooling control device of claim 29 wherein the cooling control device is operable to substantially continuously drive the operation of the cooling system based on received usage information.

36. The electronics cooling control device of claim 29 wherein the function to drive selects a speed at which a cooling fan operates.

37. The electronics cooling control device of claim 29 wherein the function to drive selects a degree to which thermoelectric coolers are powered in a liquid cooled system.

* * * * *